United States Patent [19]
Tang et al.

[11] Patent Number: 5,793,365
[45] Date of Patent: Aug. 11, 1998

[54] SYSTEM AND METHOD PROVIDING A COMPUTER USER INTERFACE ENABLING ACCESS TO DISTRIBUTED WORKGROUP MEMBERS

[75] Inventors: John Tang, Palo Alto; Ellen Isaacs, Sunnyvale; Trevor Morris, Mountain View; Thomas Rodriguez, San Francisco; Alan Ruberg, Foster City; Rick Levenson, Mountain View, all of Calif.

[73] Assignee: Sun Microsystems, Inc., Mountain View, Calif.

[21] Appl. No.: 582,155

[22] Filed: Jan. 2, 1996

[51] Int. Cl.$^6$ .................................... G06F 17/00
[52] U.S. Cl. .................................... 345/329
[58] Field of Search .................... 395/326–332; 345/326–332

[56] References Cited

U.S. PATENT DOCUMENTS

| | | | |
|---|---|---|---|
| 5,233,687 | 8/1993 | Henderson, Jr. et al. | 395/158 |
| 5,561,811 | 10/1996 | Bier | 395/326 |
| 5,594,859 | 1/1997 | Palmer et al. | 395/330 |

OTHER PUBLICATIONS

Gajewska, H., Manasse, M. and Redell, D., "Argohalls: Adding Support for Group Awareness to the Argo Telecollaboration System". User Interface Software and Technology Symposium, pp. 157–158, Nov. 157–158, Nov. 14–17, 1995, Pittsburgh, Pennsylvania.

Berc, L., Gajewska, H. and Manasse, M., "Pssst: Side Conversations in the Argo Telecollaboration System", User Interface Software and Technology Symposium, pp. 155–156, Nov. 14–17, 1995, Pittsburgh, Pennsylvania.

Dourish, P. and Bly, S., "Portholes: Supporting Awareness in a Distributed Work Group", Computer Human Interaction Conference, pp. 541–547, May 3–7, 1992.

*Primary Examiner*—Almis R. Jankus
*Attorney, Agent, or Firm*—Fenwick & West LLP

[57] ABSTRACT

A system and method provides each networked computer user with a user interface displaying visual representations of selected other computer users, generally of those workers in the user's workgroup, and further provides communication mechanisms for efficiently and easily contacting any of the displayed workers. The visual representations of the other users are frequently updated to indicate the activity level of these users. These activity level cues help users predict if the other users are likely to be available for an interaction. The user interface also includes a display portion and mechanism for storing data files and the like so that all workgroup members may accumulate a set data files commonly used by the workgroup, and may transfer files in this manner to other workgroup members. The data files may be stored in association with specific interactive discussion windows, known as chat rooms, or directly in the user interface.

41 Claims, 9 Drawing Sheets

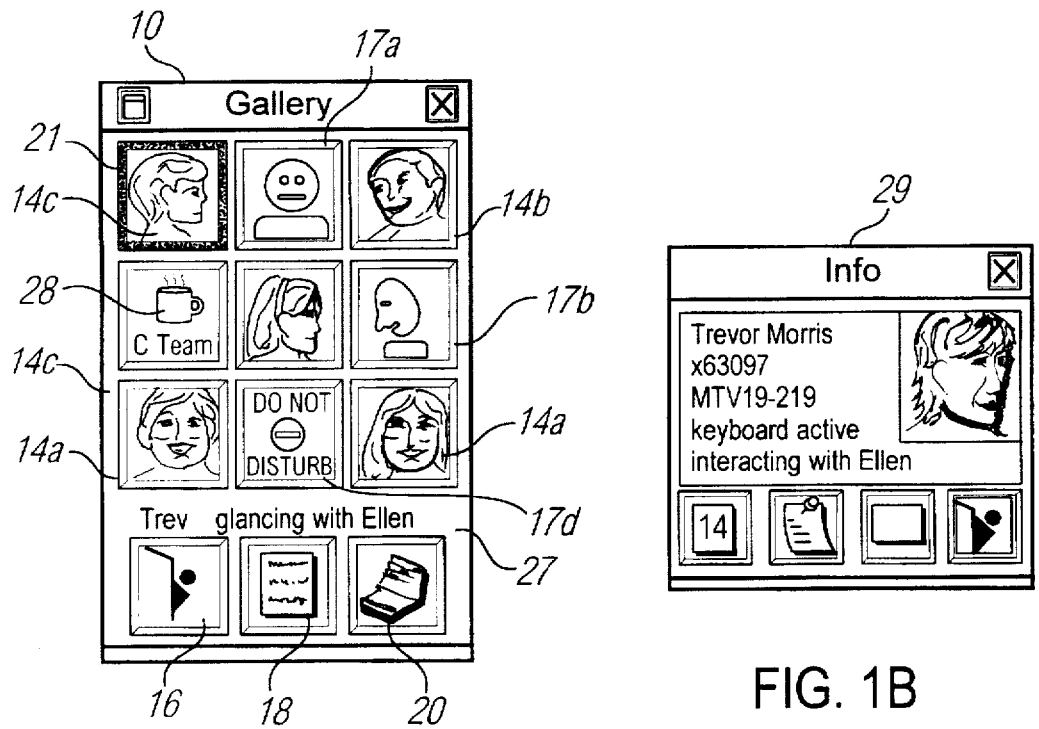
FIG. 1A
FIG. 1B
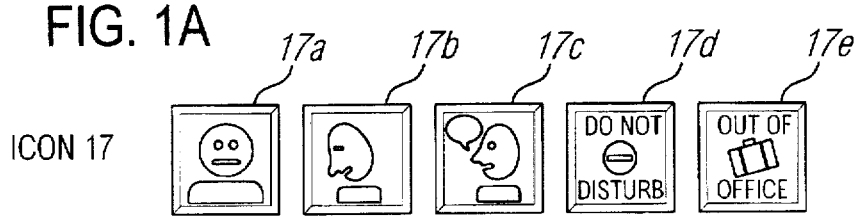
FIG. 2
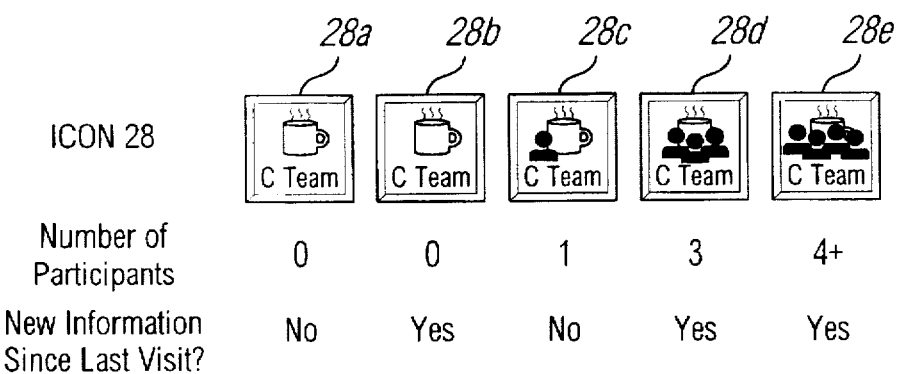
FIG. 4

SYSTEM AND METHOD PROVIDING A COMPUTER USER INTERFACE ENABLING ACCESS TO DISTRIBUTED WORKGROUP MEMBERS

RELATED APPLICATION

This application is related to the application Ser. No. 08/577,728, filed on Dec. 22, 1995, pending, entitled SYSTEM AND METHOD ENABLING AWARENESS OF OTHERS WORKING ON SIMILAR TASKS IN A COMPUTER WORK ENVIRONMENT, which is incorporated by reference herein. Both applications are assigned to Sun Microsystems, Inc. of Mountain View, Calif.

BACKGROUND

1. Field of the Invention

The present invention relates generally to the field of computer user interface design, and more particularly to user interfaces and methods for improved user collaboration in computer-based work environments.

2. Description of the Background Art

In many workplaces, workers are organized into teams or workgroups that have a common mission, and shared responsibility for a project. In these workgroups, a significant degree of a worker's productivity is based on the ability to directly interact with other workers in order to exchange information about common problems, issues, or concerns. Recent research has shown that informal interactions are responsible for much information flow in an organization, but are under-utilized compared with how effective they are. In particular, recent investigations of information flow in organizations have found that when people wanted to communicate information to others in the organization, they tended to communicate through the hierarchical management chain using formal mechanisms, such as documents, presentations, even though they did not find these mechanism to be very effective. On the other hand, when workers wanted to find out information from other parts of the organization, they tended to ask other workers who they knew and respected, thus, relying on informal interactions, particularly personal, spoken communications. This research suggests that informal interactions often lead to an improved sense of community in the workplace and team cohesion, more efficient problem solving, better coordination toward the shared goals, and an increased common pool of knowledge and experiences among workers. These factors tend to improve the performance of individual workers and workgroups as a whole, and often improve morale and job satisfaction.

Physical proximity supports group work by enabling group members to enter informal, unplanned interactions. In particular, in working environments where group members share nearby offices and workspaces, close physical proximity enables one group member to easily contact other group members and initiate a dialogue on some issue of concern. Physical proximity is important for enabling spontaneous interactions that in turn facilitate workers in coordinating their actions and creating shared understanding of common issues. The ability to informally interact in this manner helps workers accomplish their work, and the awareness workers have of other workers present facilitates their ability to interact. In summary, physical proximity provides three essential elements supporting spontaneous interactions: 1) a set of social cues that enable each worker to determine the appropriateness and likelihood of success for an interaction; 2) efficient mechanisms for engaging in the interaction; and 3) a set of physical "places" where workers can meet to engage in spontaneous interactions.

However, several trends are combining to make it hard for work groups to exist in the same physical environment and still remain cohesive. As organizations get larger in size, members of work groups are often distributed among different buildings on a campus, or even different geographical sites. Workers for a given project may even be distributed globally. Companies are also embracing flexible work schedules, telecommuting, and work-at-home alternatives.

All of these trends combine to reduce the physical access that work groups traditionally shared by being in close physical proximity to each other, and hence, reduce both the social cues and the efficient mechanisms for spontaneous interactions. An increasing amount of group work is accomplished through electronically mediated mechanisms, such as networked computer systems, facsimiles, video teleconferencing and the like. While these electronic facilities can very efficiently aid the flow of raw information across the physical distances that separate group members, they do not provide the same degree of immediate access, and rich sense of group awareness and coordination that is shared by people who work physically in the same location. This tends to impair the overall performance of the workgroup.

Prior attempts to improve workgroup interaction in electronic environments typically provide specific types of interactions, but do not support the spontaneous interactions of traditional physical environments. For example, video-conferencing typically requires the workers to schedule an interaction in advance, which is not conducive to spontaneous interactions. In some video-conferencing systems integrated with computers, the user may employ video-conferencing in the same manner as the telephone. Still, this provides no more a sense of awareness than does the telephone, since the worker still has to call the other person, who may or may not be available. Other video-based systems used video cameras to periodically take snapshots of the interiors of workers' offices. While providing a sense of others in the group, such an approach can be perceived as invasive to individual privacy, particularly because the worker may not be fully aware of who sees the snapshot of their office. In addition, because this type of system requires everyone to have video capability, the system cannot be employed in all distributed workgroups, with some members working at home, on the road, or other circumstances where video is not supported.

Thus, it is desirable to provide a computer-based mechanism that provides to workgroup members in a distributed electronic environment both the social cues useful to help identify opportunities for informal communication between group members, and efficient, mechanisms to support such interactions. A desirable system should be integrated with the computer software architecture of the worker's computers so that interactions between workers can be provided by existing communication services, and so that the worker's computer can be used to monitor the presence or level of activity of each worker, thereby providing additional information about the likelihood of initiating successful interactions between workers.

In addition to spontaneous interactions, workers in shared physical environments often share physical resources and information. For example, workers may have a library of documents that are routinely used, or there may be a bulletin board for posting notices. Such shared places further enrich the productivity and information flow between work group members. In the electronic environment, however, the mechanisms for transferring and sharing resources are often not efficiently integrated with communication mechanisms. Thus, files that are commonly used by workgroup members are stored in specific computer directories, accessed through file browsers. But conventionally there are no communication mechanisms integrated with the file browsers so that workers may communicate with respect to the files. Thus, file directories are like "places" where documents are stored, but no communication is supported in such "places."

Conversely, email tools are primary communication tools, and while enabling workers to attach documents and store them, the communication function is essentially separate from the creation of commonly used documents and resources. In other words, while workers can email each other attachments, and maintain a thread of discussion, email is an inherently serial communication tool, with each user reading and responding to a chain of messages. Email does not provide the interactive communication possible in physical environments.

Finally, chat rooms are known. Chat rooms are interactive discussion windows wherein a number of users on separate computers can communicate by text entry in a shared text window that is displayed on each of the user's computers. Chat rooms do provide for a sense of "place" for the interactive discussion. However, conventional chat rooms do not provide any mechanism to store and access shared files or documents. Accordingly, it is desirable to provide an electronic environment that integrates the continuous interactive discussions of chat rooms with the ability to store and transfer documents and files as in file directories.

SUMMARY OF THE INVENTION

In its various embodiments, the present invention overcomes the limitations of conventional systems by providing a user interface display on a worker's computer that includes a visual representation of the members of a workgroup, and coupled to this user interface display, various communication mechanisms for contacting any of the workgroup members and transferring data to them. The user interface display is called a "gallery window." Each worker's gallery window displays the visual representations of selected other members of the workgroup. For each worker so represented, there is a visual indication of the availability of that worker. This allows a worker observing the gallery window to immediately assess the likelihood of a successful interaction with each of the other workers. The visual indication of availability is updated on a regular and frequent basis. These visual representations provide an analog for the physical, visual, or auditory cues that an individual perceives when working together in a physically proximate environment. The visual representations allow each user of the system to assess the appropriateness and likelihood of success of communicating with other group members.

A user interface display and system in accordance with the present invention further provides easy and simplified means of communication with group members regardless of their physical location, insulating the user from any of the underlying implementation, protocol, or hardware concerns associated with different group members being on different networks, computer types, and the like.

One of the communication mechanisms in accordance with the present invention is an improved chat room that allows workers to store and share documents, files, and the like, typically related to the topic of discussion in the chat room. Each chat room includes an object shelf that displays an icon or other representation of a data file. Workers are able to place and remove files from the object shelf. This allows workgroup members, or other chat room participants, to have in one place both a discussion of a selected issue or concern, and access to files or documents related to the issue. The object shelf allows a workgroup to conveniently transfer and share information related to specific topics, bypassing conventional approaches, such as accessing specific directories and files with a file browser on the one hand, and email discussions with document attachments on the other. By providing a common place where both discussions and data items related to specific topics can be stored, workgroup members can build up a rich environment of shared information and materials. Alternatively, an object shelf may be integrated with the gallery window to allow the workgroup members to easily share common resources. The combination of selected workers and data creates a context for the use of the data in the shared work of the group.

The present invention also encompasses a flexible architecture enabling distributed workers who have varying levels of hardware support to use the system. Home-based workers may have relatively simple computers and may have limited support for real-time video capture, or even audio through their computer. Other group members may have these features. The communications architecture supports connections between group members in a variety of modes-audio, video, text—as a function of the user's preference and ability to support a given connection type. An architecture supporting the present invention makes use of the existing communication facilities of the user's computer and network to integrate such facilities into the user interface mechanism providing access to other workgroup members.

BRIEF DESCRIPTION OF THE DRAWINGS

FIG. 1 is an illustration of one embodiment of the gallery window in accordance with the present invention.

FIG. 2 includes illustrations of default icons for indicating various levels of availability.

FIG. 4 includes illustrations of the chat room icons for indicating various numbers of workers in a chat room and whether or not new information has been added to the chat room.

DETAILED DESCRIPTION OF THE INVENTION

Gallery User Interface

Social Cues in a Computer Environment

Figure 3:
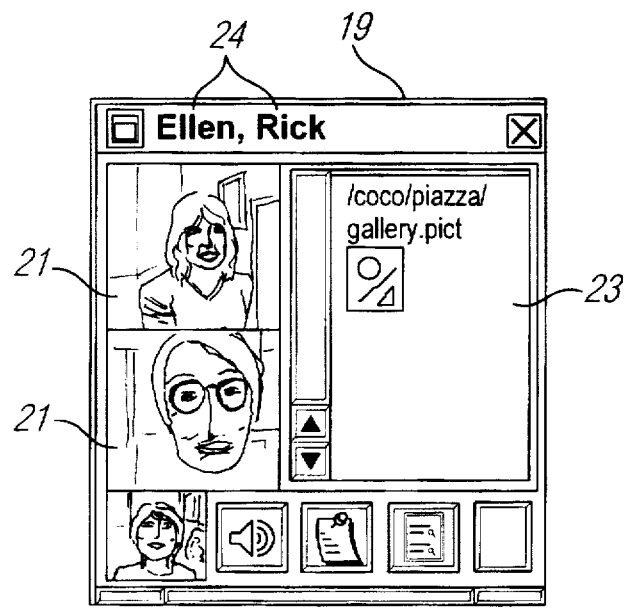
FIG. 3 is an illustration of a glance window.

Referring now to FIG. 1, there is shown one embodiment of a user interface of a mechanism enabling access to distributed workgroup members. FIG. 1 illustrates what would appear on the screen display, commonly called the "desktop" of a particular user, here called the current worker. On the desktop, there are several windows, including one embodiment of a gallery window 10, which is the user interface portion of the gallery mechanism. The gallery window 10 provides a visual mechanism for informing the current worker of the presence and communication opportunities for a user-defined set of group members. The gallery mechanism underlying the gallery window 10 further provides a means of efficiently initiating an interaction with such workers. The gallery window 10 is preferably sized to be easily visible yet unobtrusive on the current worker's desktop.

The gallery window 10 comprises a plurality of visual representations of a selected set of workers. These workers may be in the current worker's work group, however that work group is organizationally defined, or may include any other workers whose computers provide the gallery mechanism and hardware support described herein. In one embodiment, each worker decides which other workers' visual representations are displayed in the gallery window 10. In the preferred embodiment, the visual representation is an icon (14, 17) with a graphic representation of the worker, as shown in FIG. 1. Other forms of visual representation may be used, ranging from still or motion video images to a simple text string, or other information, depending on the level of hardware support available to each worker, the network bandwidth available, and the level of privacy each worker desires. The term "icon" is used herein to mean any of these, or other types of visual representations, not merely fixed graphic images. For workers with computers including video cameras, the icon 14 may be created by the worker by capturing a video image of themselves. For workers without video support, an icon 14 can be selected from a set of icons or created by the worker using graphic manipulation tools, or a text string may be specified by the worker associated with the icon 14. The icons 14 may be created automatically, or manually, and may be modified by the user. The set of workers represented in the gallery window 10 is preferably selected by the current worker, the controller of the desktop. In a typical implementation, it is expected that a worker will keep the gallery window 10 open on the desktop while using the computer, and glance at it occasionally to obtain an awareness of other workers.

In the gallery window 10, each worker's icon 14 provides visual information specifying the worker's level of their activity. This information provides specific yet subtle social cues that allow a worker viewing the gallery window 10 to assess the availability of each worker, and hence the appropriateness of communicating with such a worker, and the likelihood of success in attempting to do so. In this manner the gallery window 10 provides in the distributed computing environment the types of social cues useful for establishing appropriate spontaneous interactions, social cues which the computing environment otherwise eliminates because of the loss of physical proximity between the workers.

The level of activity of a worker may be characterized into a number of classes. In one embodiment of the present invention, there are at least five classes of activity:

1) attentive: the worker as actively working at their computer, and is not engaged in any interaction with other workers. Thus, the worker is immediately available for interaction with other workers.

2) idle: the worker is not actively working at their computer, and is not engaged in any interaction with other workers. The worker may not be in their office, and thus, may not be immediately available for interaction.

3) engaged: the worker is currently engaged in a computer mediated interaction with other workers. (e.g., desktop video conference, chat)

4) do not disturb: the worker has specifically indicated to others that they do not want to be disturbed at the current time. This activity level is preferably established by the worker.

5) absent: the worker is not currently in their office. This activity level may be established by the worker or determined automatically.

It is not necessary that all of these levels of activity be used in an implementation of the present invention. In one embodiment, only the first four levels are used.

The level of activity indication may be provided in at least two ways. First, there may be provided a standard set of icons 17, one for each level of activity. FIG. 2 illustrates individual icons 17a–17e for the attentive, idle, engaged, do not disturb, and absent levels of activity. These icons 17 serve as the default icons in the gallery window 10 for indicating each worker's level of activity. Second, for workers whose computers support video capture, or other imaging tools, a worker may capture a separate video image for use with a specific level of activity. If a worker creates such a personal icon, it is used in place of the default icons. Thus, a worker may choose to replace the default attentive icon 17a with one of their own image.

FIG. 1 illustrates these various default and person icons. Icons 14a represent the attentive level of activity, and are provided as personal icons by the respective workers. Icon 17a also represents the attentive level of activity, but the worker associated with the icon has not provided their own image for use in the gallery window 10. Icon 14b represents the idle level of activity, as does icon 17b. Icons 14c represent the engaged level of activity, as does icon of 17c FIG. 2. Icon 17d indicates that the worker associated therewith does not want to be disturbed. In the preferred embodiment, the use of the default icons 17a–17e of FIG. 2 does not impair the current worker's identification of the worker associated with the icon 17, even though it may not be labeled, because each worker's icon is placed in a location in the gallery window 10 selected by the current worker. Thus, for icon 17a in the top row, the current worker would knows which worker is represented by the icon, even though it is not indicated on the face thereof. A worker can also select an icon 17 and get more information on the user associated with the icon.

As a further refinement, there may be provided specific visual indications representing the type of interaction the worker is engaged in, for example, a distinct icon 14, 17 for video-conferencing, telephone use, and the like.

As indicated by icon 17d (FIG. 1 and FIG. 2) a worker may choose to indicate that she wishes to work undisturbed by others in the work group, similar to closing the door of one's office. As with the physical environment, such a "sign" does not prevent a worker from interacting with this worker, but rather, provides an important social cue as to the appropriateness of such contact. The current worker is still able to engage one or more of the communication mechanisms to interact with such worker. Similarly, if the worker is going to leave the office, the icon 14 may be changed to reflect that status. This change to an absent icon may be done manually by the worker, or automatically by the system.

In the preferred embodiment, a worker's activity level is a function of the use of their computer or their presence in their workspace. The level of activity information is determined by a worker's computer in an appropriate manner, such as tracking keyboard activity, determining the currently active application on the user's computer, analyzing a video image taken by a video camera in the office, or by analyzing audio data captured by a microphone, or the like. The worker's computer may further be integrated into the electrical system of the worker's office, and use motion detectors, sound detectors, or the like, to determine whether the worker is present. For example, in one embodiment, the worker's computer monitors the activity of the worker's keyboard. When the keyboard is idle for a first predetermined period of time, such as three minutes, each gallery window 10 in which the worker's icon 14 appears is updated to display the icon 14 associated with the worker and the idle level of activity. If the keyboard remains idle for a second predetermined period of time, such as two hours, the level of activity may be determined to be "absent", and the worker's icon 14 updated accordingly. In an alternate embodiment, an absent determination may be based on whether the worker has logged out of their computer, or has left their office, using motion detection or sound detection systems.

The level of activity information for each worker is updated automatically, preferably any time there is a change in the worker's state. This change in level is then reflected in all of the gallery windows 10 in which the worker's icon 14 appears, with the appropriate icon 14 being selected to indicate the worker's current level of activity. The gallery window 10 will display either the default icon 17 associated with the worker's current level of activity, or a personal icon 14 if one exists.

In addition to the visual indication of availability in the gallery window 10, the current worker may obtain more detailed information about an individual worker displayed therein by selecting the icon 14 of the worker. In one embodiment, the gallery window 10 also contains a status area 27. The status area 27 displays, in response to selection of one of the icons 14, the more detailed information about the level of activity of the worker associated with the icon 14. The currently selected icon 14 is identified to the current worker by the highlighting 21 around the selected icon 14. In one embodiment, the status area 27 displays the worker's name and their current activity level. For example in FIG. 1, the status area 27 indicates that the worker represented by the selected icon 14c is engaged in an interaction with another worker ("Trevor glancing with Ellen"). The length of time that the worker has been in their current level of activity may also be displayed. If the worker's icon indicates that the worker is idle, such as icon 14b, then clicking on the icon 14b will cause the status area 27 to display the length of time the worker has been idle. This is useful information for assessing the likelihood of a successful interaction, since the longer a worker's computer is idle, the less likely it is that they are in their office. If the worker is currently using their computer, the icon 14a, 17a will show this as the "attentive" level of activity, and the status area 27 will display the length of time that the worker has been in this state.

A current worker may also obtain more information about a displayed worker using the information button 20. Selecting an icon 14 and clicking on the information button 20 retrieves the selected worker's business card 29. The business card object 29 is more completely described in the related application.

Communication Mechanisms for Enabling Spontaneous Interactions

The gallery window 10 provides access to various communication services through a contact button 16. In a preferred embodiment, the current worker may engage any available communication mechanism with one or more of the workers represented in the gallery window 10 through simple point and click operations. In one embodiment, the current worker selects one or more of the icons 14, 17 in the gallery window 10, and then presses the contact button 16. The gallery mechanism, in conjunction with a communications server provided as part of the computer environment and network, then selects a communication mechanism, such as video-conferencing, email, text chat, audio, or the like. This selection process is preferably automatic and transparent to the user, and is based on both the user preferences of the worker initiating, the interaction and the worker receiving the interaction, and on the available hardware/software support of each worker. Thus, if both workers have video capability, then a video conference is selected; if only one worker has video, and the other audio support only, then an audio-only dialogue is initiated, and so on. If neither of these communication mechanisms is available, the initiating user may then select another mechanism, such as text chat or email. Transparency is achieved in the preferred embodiment by providing in the gallery mechanism interfaces to the system-provided communications server and communication mechanisms. Distributed computing systems, such as those described below, support this type of architecture. In addition, the gallery mechanism may indicate to the user which communication mechanisms are available, for example by graying out icons for unavailable mechanisms.

Where the gallery mechanism initiates a desktop video-conference, there is provided a further window on the user's computer to facilitate this function. FIG. 3 illustrates one embodiment of this separate display window, here called a glance window 19. The glance window 19 provides various panels 21 of video stream data for each of the participants of the video-conference. The glance window 19 also includes an object portal 23 that allows the participants to pass data, such as text strings, objects, data files, and the like by cut and paste (or drag and drop) operations. The object portal 23 supports the manipulation of object references for such operations. If a worker is already engaged in a desktop video teleconference when the current worker attempts to communicates with that worker, the glance window 19 displays the names of the participants and/or provides their images 21 to the current worker. This allows the current worker to determine if it is appropriate to attempt to join in the ongoing interaction, much like the assessment a worker would make in deciding to join a conversation taking place in an office corridor. Again, this type of information provides some of the social cues normally available in physical workspaces but conventionally absent in computer-based work environments.

Referring again to FIG. 1, from the gallery window 10 the stick-up button 18 allows the current worker to create a message that may include text, recorded audio or video or the like, and direct that message to one or more workers selected from the displayed icons 14, 17.

Integrated Chat Rooms

One of the mechanisms for engaging in spontaneous interactions in the environment of the present invention is a set of electronic "places" where group members can engage in more specific, yet still spontaneous discussions. These "places" are chat rooms.

Each chat room has a visual representation, also an icon 28, in the gallery window 10. In FIG. 1, only one chat room icon 28 is displayed. Typically, a group, or a company, may support numerous chat rooms. Accordingly, multiple chat room icons 28 may be maintained in the gallery window 10 at the current worker's choice, so that any of these chat rooms may be easily accessed with point and click operations.

As with the worker's icons 14, the icon 28 of each chat room reflects the level of activity in the chat room at the current time. This allows the current worker to determine whether to enter a chat room and "join" the discussion. The level of activity may be indicated in a chat room icon 28 by a mapping between the number of workers in the room, and a visual attribute of the chat room icon 28. One type of mapping is to provide an iconographic representation of the worker for each worker present, up to some to limit. FIG. 4 illustrates examples of such mappings. For example, a different icon 28c, 28d is provided for each of 1 or 3 workers, and another icon 28d is used to indicate 4 or more workers. Icon 28a is the simple chat root icon used when no one is currently present therein. Other number-attribute relationships can be used, as could other types of visual attributes.

Figure 5:
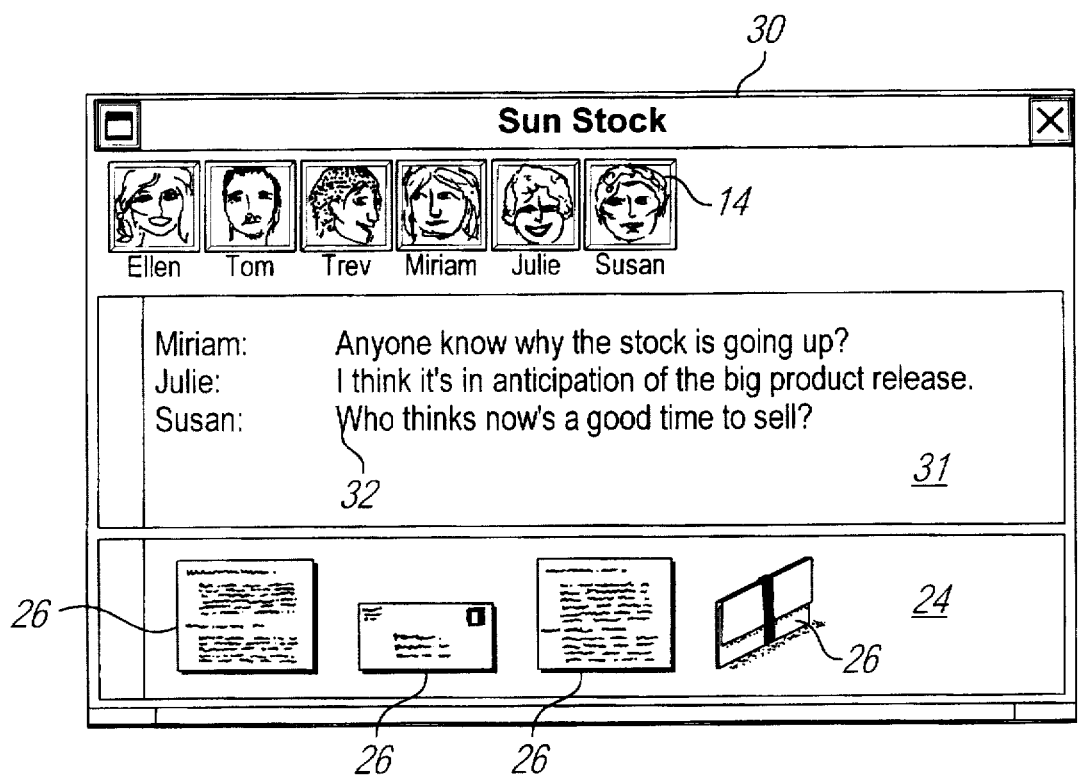
FIG. 5 is an illustration of one chat room with object shelf.

The worker "enters" a chat room by selecting its icon 28 (e.g. by double clicking or selecting the icon and clicking on the contact button), which causes the display of a chat room window 30. A chat room is a place for synchronous group interaction. FIG. 5 illustrates one embodiment of a chat room window 30. In the chat room window 30 there is displayed the icon 14 associated with each worker who is presently in the chat room. If a worker's computer supports video, their video is used as their icon in the chat room. There are a variety of ways to contribute to a discussion in a chat room. For those with audio input capability, they may press a button to speak. Anything they say is broadcast to others in the chat room. Additionally, any worker can enter text 32 at their keyboard; this text is displayed along with the worker's name in the text window 31.

In each chat room window 30 there is provided a mechanism for chat room participants to access and share common resources and information, typically resources that are relevant to the topic of discussion in the chat room. This mechanism is the object shelf 24. In the object shelf 24 there are displayed various data items 26, such as documents, files, objects, code samples, or any other type of data that workers may find useful. Files and objects are placed on the group shelf 24 by dragging their icon 26 from some other window, such as file browser, and dropping the icon 26 into the shelf 24, or by using any equivalent mechanism for transferring data. Files may also be copied from the object shelf 24 to the worker's own desktop or to file directories and the like. The three areas of the chat room window 30 may be independently resized—some tasks (such as a virtual project room) will need a large object shelf 24, while others, such as an impromptu discussion, will use a larger shared text area and video and images.

Figure 6:
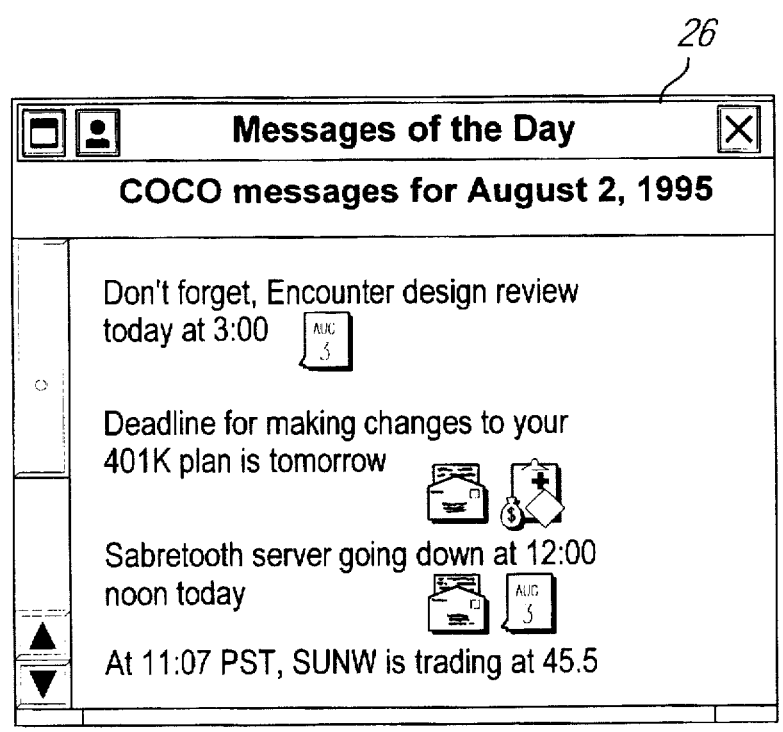
FIG. 6 is an illustration of the contents of a document in an object shelf.

Typically, the data items 26 are related to the topic for the chat room. For example, in FIG. 5, in the chat room for the discussion of the company's stock plan the object shelf 24 includes a document 26 with an announcement of the stock plan. Any worker may open the document 26 and display a text window of its contents. FIG. 6 illustrates a window for viewing a data file 26 in the object shelf 24.

In addition to indicating the number of participants, the chat room icons 28 in the gallery window 10 may further reflect whether there are any new data items 26 have been added to the object shelf 24 or any new text discussion added to the shared text window 31 since the last time the current worker used the chat room. FIG. 4 illustrates this information, which is indicated to the worker by the shading of the icon 28. A light background shade, which is more readily noticeable, indicates that new information has been added. A dark background shade indicates that no new information has been added. In addition, the chat room indicates which items are new or changed when a worker enters the chat room.

Figure 7:
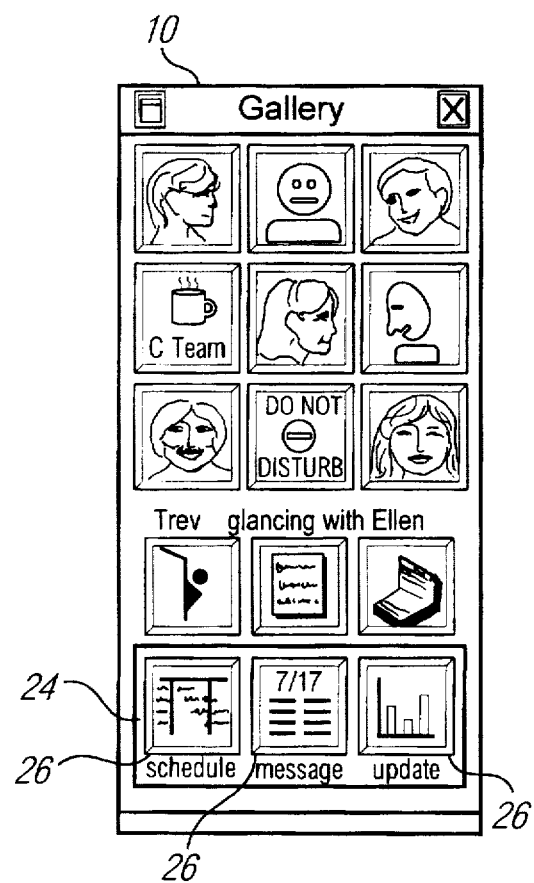
FIG. 7 is an illustration of an alternate embodiment of the gallery window.
Figure 8:
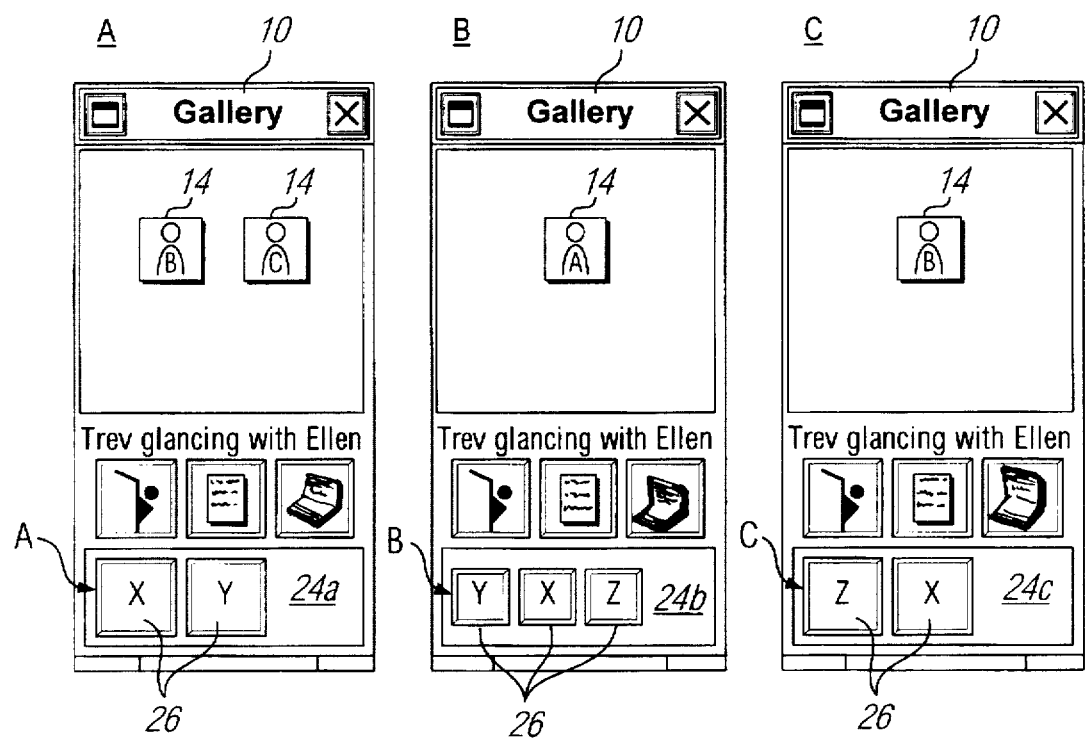
FIGS. 8(a-c) are illustrations of the operation of one embodiment of the gallery window incorporating an object shelf.

In an alternative embodiment, there is provided an object shelf 24 directly in the gallery window 10 itself. FIG. 7 illustrates a gallery window 10 including an object shelf 24. The behavior of the object shelf 24 is essentially the same as above. However, because there is single object shelf 24, and yet each gallery window 10 displays a different set of worker's icons 14, there are a number of ways of determining which worker's gallery windows 10 display which data items 26. In one embodiment, the data items 26 appear only in the gallery windows 10 of the workers whose icons 14 are displayed in the gallery window 10 of the of current worker. FIG. 8 illustrates this data relationship. In FIG. 8, there is shown the gallery windows 10 of three different workers A, B, and C. Worker A has placed data item X in the object shelf 24a of her gallery window 10a. Because the icons 14 of workers B and C are included in A's gallery window 10a, data item X appears in the object shelves 24b, 24c of these workers. Worker B has placed data item Y on his object shelf 24b, and it appears in the object shelf 24a of worker A, since worker A's icon 14 is included in worker B's gallery window 10. Worker C has placed data item Z in her object shelf 24c, and it also appears in worker B's object shelf 24b. Thus, worker B sees the data item placed by both of the other workers, though workers A and B only see a more limited set of information. Data files 26 in the object shelf 24, whether in a chat room window 30 or gallery window 10, preferably have file level access privileges determinable by the worker who created the data item 26 or system administrator.

In another alternative embodiment, the gallery windows 10 are always reciprocal, such that for any pair of workers A and B, if worker A's icon 14 appears in worker's B's gallery window 10, then worker B's icon 14 appears in A's gallery window 10. In this embodiment, data items 26 on the object shelf 24 of one gallery window 10 appear in all other gallery windows 10 of the set of workers.

In an alternative embodiment, data items 26 provided by a worker appear in the object shelves 24 of the gallery windows 10 of all other members of the worker's group, however that group is defined, and regardless of whether the icons 14 of such members appears in each worker's gallery window 10. This approach ensures that all group members share a common base of information and resources.

Figure 9:
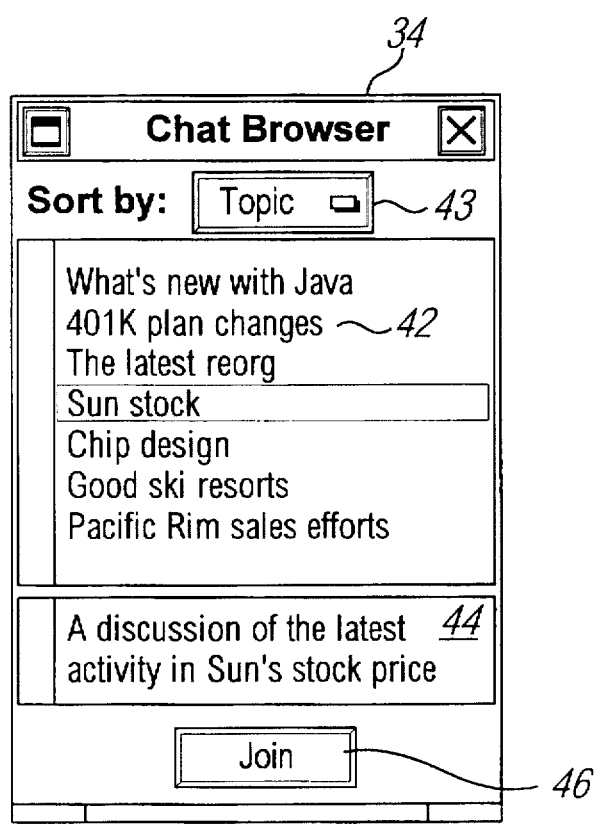
FIG. 9 is an illustration of a chat room directory.

Because there may be a large number of chat rooms available, the worker may retrieve a chat room directory 34. FIG. 9 illustrates a chat room directory 34. The chat room directory 34 includes a list of different topics 42 that are being discussed by other users of the computer system supporting the gallery system, including workers outside of the current worker's workgroup. The chat room directory 34 also allows the worker to scope the listed topics, for example, by organizational level, or geographical location. Further detailed information about each topic 42 is displayed in text area 44 when a topic is selected, as illustrated in FIG. 9. Each topic 42 is "discussed" in its own chat room window 30. Thus, in FIG. 9, the topic 42 "Sun stock" is associated with its chat room window 30, which includes text data 32 comprising the substance of the discussion. In the chat directory 34, the current worker may sort 43 the topics 42 by topic title, participant names, number of participants, date of most recent update, or other criteria. To enter a specific chat room 30 from the chat directory 34, the current worker selects a topic 42, and clicks on the join button 46.

Architecture of the Gallery Mechanism

Figure 10:
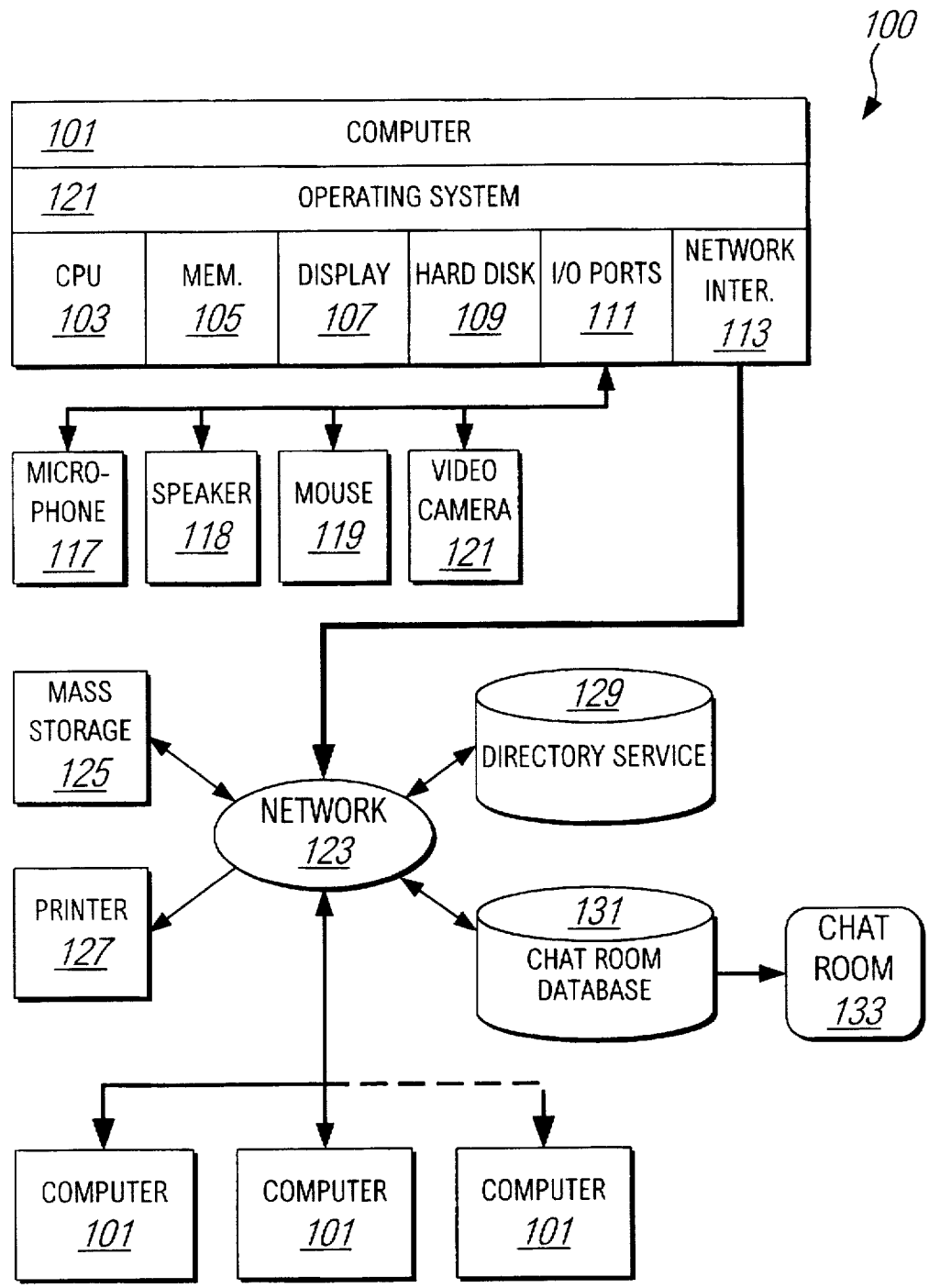
FIG. 10 is an illustration of a block diagram of the hardware elements supporting one embodiment of the present invention.

The foregoing description has focused on the behavioral aspects of an embodiment of the present invention. One embodiment of the architecture of the gallery mechanism is now described. In one embodiment, the gallery mechanism is a separate stand-alone application that users may run to maintain awareness of a predefined set of people and to have a quick way to contact them. Referring now to FIG. 10, there is shown a block diagram of one system capable of providing a gallery mechanism. The system includes a number of computers 101 connected on a network 123. Each computer 101 includes a processor 103, an addressable memory 105, a display 107, a local hard disk 109, input/output ports 111, and a network interface 113. Each computer 101 further preferably has coupled to its I/O ports a conventional mouse 119 or other pointing device. Additionally, computers 101 may include audio capability through a microphone 117 and speaker 118, and video capability through a video camera 121.

A suitable computer includes a SPARCstation™ computer manufactured by Sun Microsystems, Inc. of Mountain View, Calif.[1] Any other general purpose computer may also be adapted for use with the invention. Each computer 101 executes a general purpose operating system, such as Sun Microsystems' Solaris™ operating system, with its Open-Step windowing environment. Typically, each computer 101 is dedicated to a single worker, though a computer 101 may support multiple workers accessing various different applications as servers to clients on their own computers 101.

[1] All SPARC trademarks are used under license and are trademarks or registered trademarks of SPARC International, Inc. in the United States and other countries. Products bearing SPARC trademarks are based upon an architecture developed by Sun Microsystems, Inc.

Users connect to the network 123, such as a LAN, WAN, the Internet, or the like, through the network interface 113, and access remote servers, such as directory service 129, printers 127, storage devices 125, or other computers 101. The directory service 129 provides name translation, and more particularly, provides object references to person objects in response to queries including a person's name or other identifying information. A chat room database 131 maintains a set of chat room objects 133 providing the functionality described above. Each chat room object 133 stores text data for the discussion in the chat room and a set of references to data items 26 in the object shelf 24 of the chat room window 30. Each chat room object 133 includes methods to allow a user to join or leave the chat room, to add and to remove a user's icon 14 to the chat room window 30, to update the chat room window 30 with text or other data, and to add and to remove data items 26 on the object shelf 24. In addition, each chat room object 133 includes a method to determine the number of users in the chat room. This is used to determine the appropriate chat room icon 28 indicating the number of users in the chat room.

The chat room database 131 supports operations to create and delete chat room objects 133, and to reply to requests for chat room directory data. The chat room database 131 maintains data to create the chat room directory 34, including the topics 42 of each chat room and description 44. The chat room directory 34 includes methods to update, sort, and search the chat room directory data in response to user inputs and filters.

Figure 11:
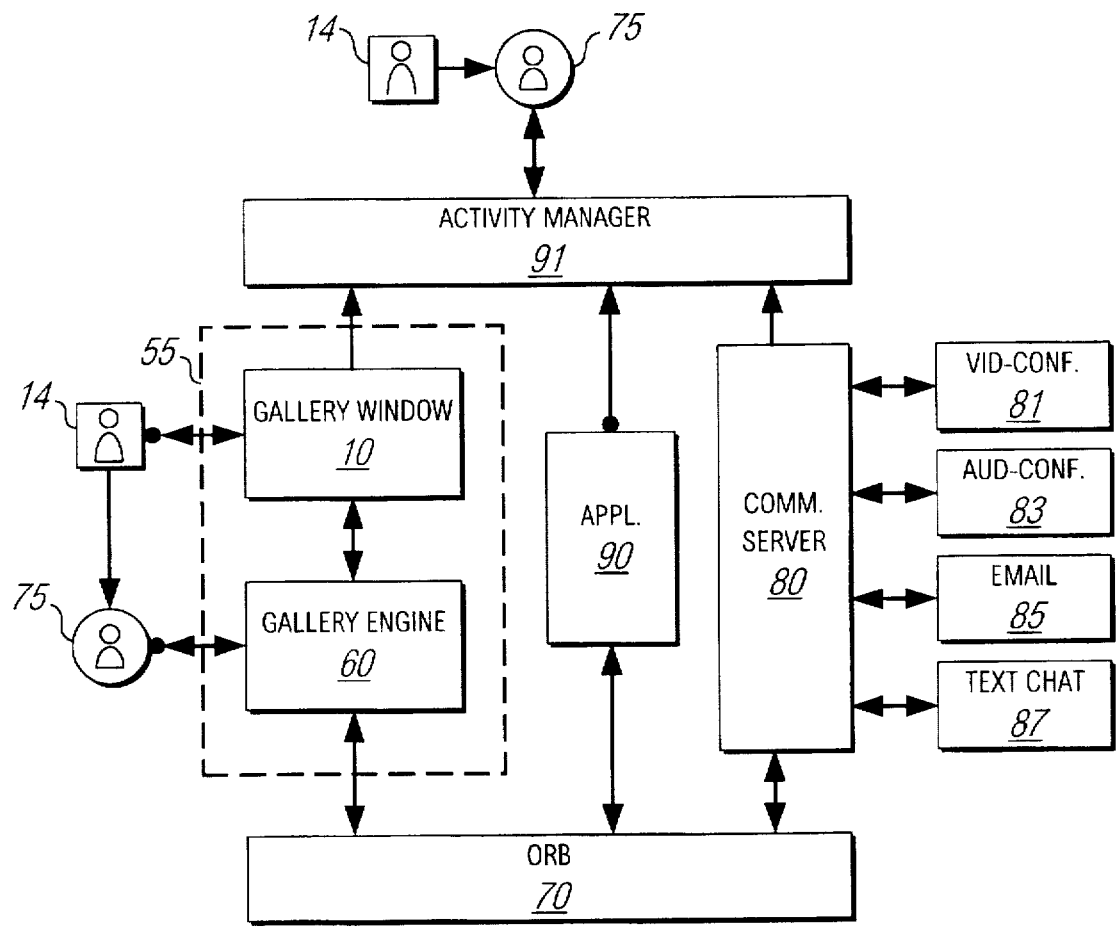
FIG. 11 is an illustration of software elements supporting an embodiment of the present invention.

The addressable memory 105 of each computer 101 further includes software components useful for implementing the gallery mechanism in accordance with the present invention. FIG. 11 illustrates an object model of the architecture of the gallery mechanism 55. The addressable memory 105 of each computer 101 includes the gallery mechanism 55, comprised of the gallery window 10, as described above, and a gallery engine 60 which manages the gallery window 10, including populating the gallery window 10, and enabling communication with other workers.

Each worker's icon 14 is associated with a data structure that maintains information about the worker, and that further provides methods to access the communication services provided by an operating system for the user's computer and network installation, such as email, video-conferencing, text dialog, and the like. In the preferred embodiment, this data structure is a person object 75. Person objects 75 are more fully described in the related application.

Briefly, a person object 75 stores user specific information, such as a user name, machine identifier, account identifier, and so forth, as conventionally used to create a user handle. A person object 75 further stores the personal icon 14 of the user, as displayed in the gallery window 10. In a preferred embodiment with a large number of users distributed across many different computers, there will be high amount of network communication devoted to periodically updating the gallery windows 10 of each worker. Accordingly, person objects 75 preferably have a compact data structure to reduce the amount of information that is passed between the various components of the gallery mechanism. For the user of the computer 101, there is a particular person object 75 that is preferably stored on the computer 101 itself, and that is provided to other computers 101 in response to requests for the icon 14 of the worker using such computer 101. The gallery engine 60 makes these requests, and thereby holds references to zero or more person objects 75 at any given time. The gallery engine 60 provides the gallery window 10 with the icons 14 as necessary, and thus the gallery window 10 is associated with zero or more icons 14, those that are selected by the user for display.

In the preferred embodiment, there is also provided an object request broker 70 (or "ORB") for handling object references for person objects and business card objects. Generally, the object request broker 70 accepts an object reference obj-ref, and returns a local handle of the object to the requesting client, thereby enabling access to the object. The object request broker 70 also converts between strings (stringified object references) and object references. More particularly, the object request broker 70 converts between stringified references to person objects 75 and complete object references to person objects 75. The architecture of suitable object request brokers is described in more detail in *The Common Object Request Broker: Architecture and Specification*, Rev. 1.2, OMG TC Document Number 93-12-43, available by anonymous ftp to omg.org. Sun's Solarism™ 2.5 operating system provides such an object request broker. Typically, on each computer 101 there will be some number of applications 90 executing while the worker is using the computer 101. These applications 90 communicate with the object request broker 70 to convert and deconvert object references to stringified objects references.

A communications server 80 handles communication services between the user's computer 101 and other computers 101 on the network. The communication server 80 has interfaces to various communication applications, such as a video conference server 81, an audio conference server 83, an email application 85, and a text chat application 87. The applications may be conventionally provided as part of the communication infrastructure of the system 100. A suitable communications server 80 and supporting applications is Sun Microsystems ShowMe™ desktop conferencing system, including ShowMe Video™ and ShowMe Audio™.

Finally, there is an activity manager 91. The activity manager 91 tracks keyboard, mouse, and other input activity to determine whether the computer is actively being used, which application window is active, and the time at which activity or idle time began. The activity manager 91 may also rely on video and audio inputs from the video camera 121 or microphone 117 respectively in determining whether the user is in her workspace.

Populating the Gallery Window

Figure 12:
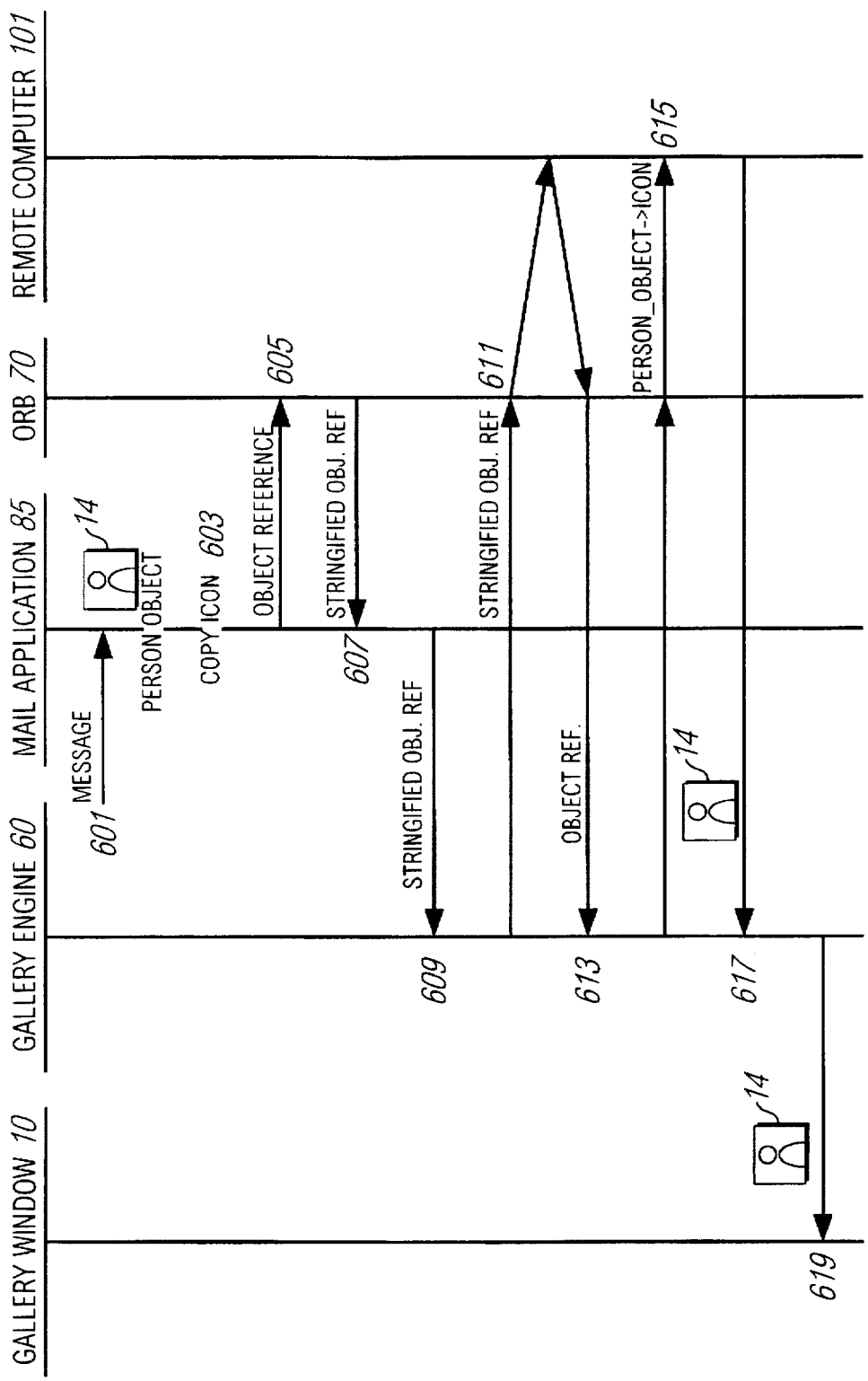
FIG. 12 is an event trace of a typical process of populating the gallery window.

As noted above, each user determines which other worker's icons 14 to have in their gallery window 10. FIG. 12 illustrates an event trace of the typical process of populating the gallery window 10 to include a new icon 14. In this figure, an email application 85 is used as an example of one type of application 90 executing on a worker's computer 101, and capable of providing access to the data necessary for inclusion of icons 14 in the gallery window 10.

Referring to FIG. 12, the email application 85 of the current worker receives 601 a message with a person object 75 and an object reference to the person object. In a preferred embodiment, the email application 85 displays an icon 14 representing the worker associated with the person object. The current worker then selects the icon 14 and invokes 603 a copy function of the email application 85. The icon 14 itself is not actually copied, but rather, the email application 85 invokes 605 the ORB 70 to obtain 607 a stringified object reference for the person object 75 associated with the icon 14. It is this data that will be passed to the gallery engine 60, and used by the gallery engine 60 to obtain the icon 14. In some instances, the ORB 70 may have already cached the stringified object reference and need not perform the conversion.

The current worker then executes 609 function of the gallery window 10, which actually pastes the stringified object reference into the gallery engine 60. The gallery engine 60 is aware of that the pasted data is a stringified reference, so it passes 611 the reference back to the ORB 70 for conversion to an object reference, obj_ref. The ORB 70 returns 613 the object reference providing access to the person object, whatever computer it may be on. In some instances, this will be the computer 101 operated by the worker who is associated with the person object. In other cases, it may be the computer operating the directory service 129.

The gallery engine 60 then invokes 615 the person object 75 via the object reference to obtain the person object 75 icon 14. This request goes through the ORB 70 to the remote computer 101. The remote computer 101 returns 617 the icon 14 associated with the person object 75 to the gallery engine 60, which displays 619 the icon 14 in the gallery window 10. The gallery engine 60 stores the object references to disk for further use. When the gallery mechanism 55 is booted up at some later point, it caches the object references for use, and displays them in the gallery window 10.

The gallery window 10 may be populated from other sources in a similar manner. For example, the icon 14 of a person may be retrieved from a naming service, networked database, or other data repository available to a user.

The gallery window 10 and gallery engine 60 operate in similar manner to populate the gallery window 10 with chat room icon 28. Thus, to include a chat room icon 28, and thereby access to the chat room object 133 associated with it, a stringified object reference to a chat room object 133 may be provided to the gallery window 10 and gallery engine 60. The gallery engine 60 invokes the ORB 70 to unstringify the object reference so that the gallery engine 60 can invoke the chat room object 133 directly to provide its icon 28. Once the object reference to the chat room object 133 is held by the gallery engine 60, the user can then access ("enter") the chat room at any time by double clicking on the chat room icon 28, which in turn invokes the method of the chat room object 133 to add the user to the chat room.

Communicating With Other Workers

Figure 13:
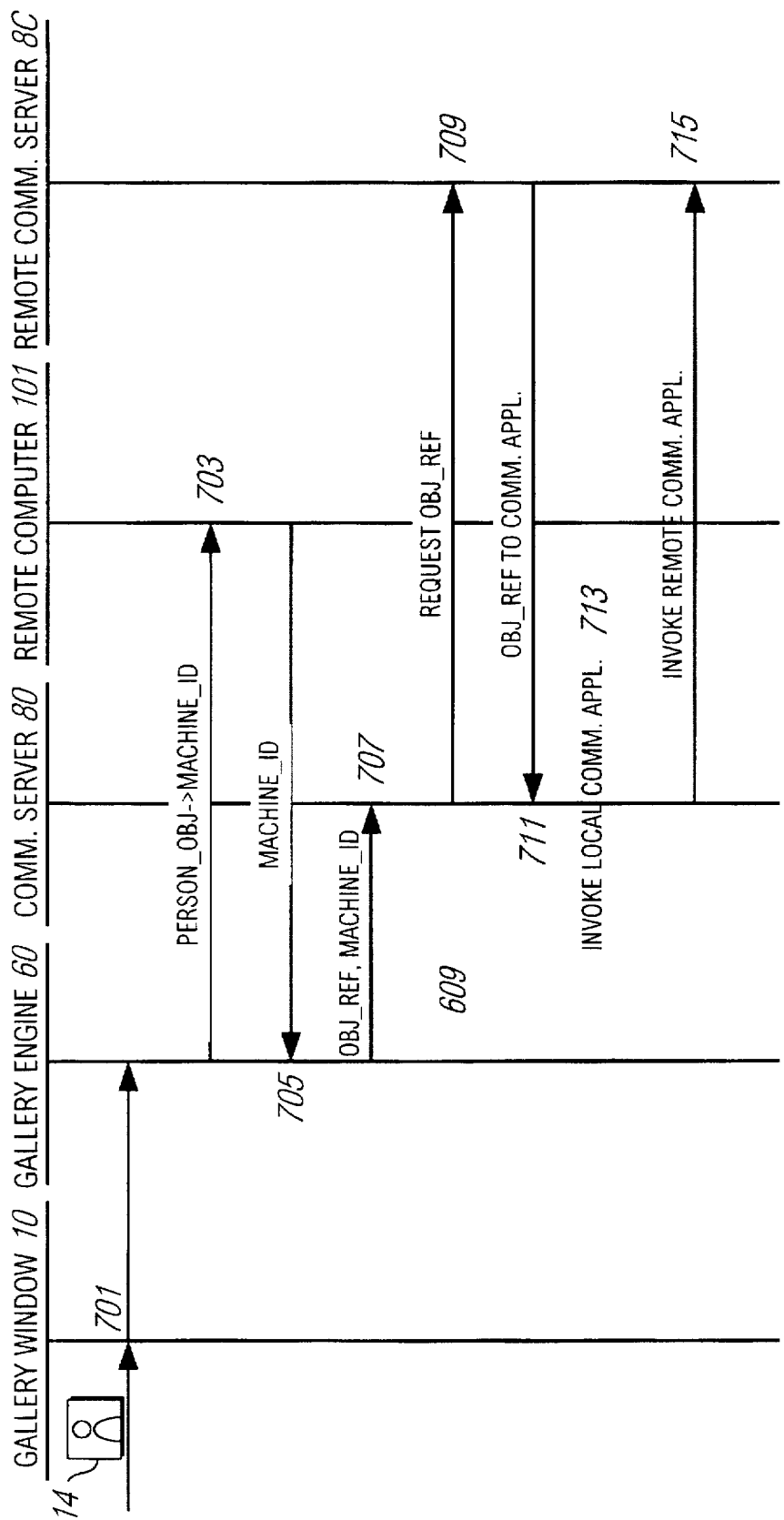
FIG. 13 is an event trace of a typical process of initiating communication to a worker displayed in the gallery window.

As noted above, the gallery window 10 provides efficient access to various communication mechanisms provided in operating environment, such as email, video-conferencing, and the like. FIG. 13 is an event trace of the typical process of communicating with a worker through the gallery window 10. The user double clicks 701 an icon 14 displayed in the gallery window 10. The gallery engine 60 receives this input, and attempts to contact the user of the computer 101 associated with the icon 14 through the communication servers 80 on these computers 101. Accordingly, the gallery engine 60 invokes 703 on the person object 75 associated with the icon 14 a request for a machine identifier of the remote computer 101. The person object 75 returns 705 that machine or an object reference of a communications server; this process is further described below.

The gallery engine 60 requests 707 a communication session from the communication server 80 on its computer 101. The gallery engine 60 passes in either a communication server name and machine id, or an object reference for the communication server 80. Alternatively, the gallery engine 60 may pass in a NULL machine identifier, and the communication server 80 is responsible for obtaining the object reference for the communication server 80 on the remote computer 101.

In a preferred embodiment, the communication server 80 selects the highest communication service available on both computers 101, which is typically video-conferencing. In this embodiment, the communication server 80 requests 709 of the communication server 80 on the remote computer 101 the object reference to a video conferencing application 81 on that computer 101. If there is no video-conferencing application 81 on the remote computer 101, there will be an error message, and the local communication server 80 selects another communication service, such as audio 83, text chat 87, or the like, informing the user of the same. If none of these synchronous mechanisms are available, the email application 85 may be selected. The remote communication server 80 returns 711 the appropriate object reference, and the local communication server 80 invokes 713 both its local equivalent, and using the received object reference, the remote communication service (715). In an alternate embodiment, the user selects the communication service level directly.

The machine identifier or the communication server object for a computer 101 having a given person object 75 is obtained as follows. Each person object 75 maintains a piece of transient state, which is the machine identifier and the communication server of where the user for the person object 75 was last active. When the user logs on and starts up, the activity manager 91 is also started up on the user's computer. The activity manager 91 monitors the windows and keyboard and determines whether the computer 101 is active. The activity manager 91 further is able to determine the machine identifier of the computer 101 it is executing on, using a standard operating system call for machine id, or an ORB call for a communication server object reference when the activity manager 91 was installed. Whenever the activity manager 91 determines that the computer is active it calls the person object 75 of the current user. The home directory of the file system of the computer 101 preferably stores a stringified object reference of the person object 75 of the current user. The activity manager 91 sends this object reference to the ORB 70 and obtains the person object, and stores in it the machine identifier or communication server 80.

When the user's computer 101 becomes idle, the activity manager 91 notifies the person object 75 that the user is inactive. The gallery window 10 is then updated to reflect this user's level of activity, as described above.

In summary, the present invention may be embodied in both a user interface and a system architecture for maintaining an awareness of activity levels and availability of selected other workgroup members, and for communicating with any such members efficiently and transparently.

The above description is illustrative and not restrictive. Many variations of the invention will be apparent to those of skill in the art upon review of this disclosure. The scope of the invention should, therefore, be determined with reference to the appended claims, along with their full scope of equivalents, and not merely with reference to the above description.

We claim:

1. A computer system providing communication services for accessing users, comprising:
   a plurality of computers, each computer associated with a user, and including:
   a user interface display displaying a visual representation for each of a number of second users selected by their first user;
   at least one communication service accessible from the user interface display, and capable of establishing a communication link between a first computer of the first user and at least one computer of a second user in response to a first input by the first user selecting the at least one second user; and
   a memory, counted to and operable by a processor, the memory including at least one storage structure associated with each second user for whom a visual representation is displayed in the user interface display, each storage structure including data identifying the second user and providing access to the visual representation of the second user.

2. A computer system providing communication services for accessing users, comprising:
   a plurality of computers, each computer associated with a user, and including:
   a user interface display for displaying a visual representation of each of a number of second users selected by a first user, wherein the visual representation of each second user is determined from a level of activity of the second user detected by the computer of the second user; and
   at least one communication service accessible from the user interface display, and capable of establishing a communication link between a first computer of the first user and a computer of at least one second user in response to a first input by the first user in the user interface display selecting the visual representation of at least one second user.

3. The computer system of claim 2, wherein there is a predetermined number of levels of activity, each level of activity associated with a selected visual representation, such that for each second user, the selected visual representation of the second user is determined by the level of activity of the second user.

4. The computer system of claim 3, wherein the levels of activity include:
   a level of activity representing the user presently using a computer, and not presently engaged in a communication with another user.

5. The computer system of claim 3, wherein the levels of activity include:
   a level of activity representing the user not presently using a computer, and not presently engaged in a communication with another user.

6. The computer system of claim 3, wherein the levels of activity include:
   a level of activity representing the user presently engaged in a communication with another user.

7. The computer system of claim 3, wherein the levels of activity include:
   a level of activity representing a user not presently available.

8. The computer system of claim 3, wherein the levels of activity include:
   a level of activity representing a user not intending to engage in a communication with another user.

9. The computer system of claim 3 wherein the visual representation is an icon, and, there is provided a predetermined set of icons, each icon associated with a predetermined level of activity.

10. The computer system of claim 3, wherein there is provided a selected visual representation associated with a selected level of activity for a specific user, such that the selected visual representation is uniquely associated with the user and displayed when the user has the selected level of activity.

11. The computer system of claim 3, wherein the level of activity of at least one second user is determined by the second user.

12. The computer system of claim 3, wherein there is displayed in the user interface display for at least one second user data descriptive of a level of activity of the second user.

13. The computer system of claim 12, wherein the level of activity of a second user is determined by the computer of the second user according to the second user's use of the computer.

14. A computer system providing communication services for accessing users, comprising:
   a plurality of computers, each computer associated with a user, and including:
   a user interface display for displaying a visual representation of each of a number of second users selected by a first user, and an object shelf adapted to:
   receive at least one data item from the user associated with the computer
   display the at least one data item to at least one other user; and
   enable a user to copy the at least one data item to a memory accessible by the computer of the user; and
   at least one communication service accessible from the user interface display, and capable of establishing a communication link between a first computer of the first user and at least one computer of a second user in response to a first input by the first user selecting the at least one second user.

15. In a computer system including a plurality of computers, each computer controlled by a user, a computer implemented method of providing information to a first user about selected second users, comprising:

storing a predetermined visual representation for each of a plurality of users;

receiving from the first user selections of second users for displaying the visual representations of the selected second users to the first user;

for each selected second user, detecting a level of activity of the second user with a computer used by the second user;

for each selected second user, determining the visual representation of each selected second user displayed in the first display area from the level of activity of the second user detected by the computer used by the second user; and for the first user, displaying in a window on the computer controlled by the first user, the visual representations of the selected second users.

16. The method of claim 15, further comprising:

for each user, providing a second display area in the first window for receiving and displaying selected data items.

17. The method of claim 16, for any of the plurality of users being a first user, the second display area consists of:

data items received from the first user in the second display area of the first window displayed on the first computer; and data items received from at least one second user in a second display area of a first window displayed on a second computer controlled by the second user, where there is a visual representation of the at least one second user displayed in the first display area of the first window on the first computer.

18. The method of claim 16, wherein each user is a member of a group, and for each first user the selected data items include data items provided in the second display area by any member of a group including the first user.

19. The method of claim 15, wherein the level of activity of at least one second user is determined by the second user.

20. The method of claim 15, wherein there is a predetermined number of levels of activity, each level of activity associated with a selected visual representation, such that for each second user, the selected visual representation of the second user is determined by the level of activity of the second user.

21. The method of claim 20, wherein a selected user provides the selected visual representation associated with a selected level of activity for the user, such that the selected visual representation is uniquely associated with the user and displayed only when the user has the selected level of activity.

22. The method of claim 16, wherein the levels of activity include:

a level of activity representing the user presently using a computer, and not presently engaged in a communication with another user.

23. The method of claim 15, wherein the levels of activity include:

a level of activity representing the user not presently using a computer, and not presently engaged in a communication with another user.

24. The method of claim 15, wherein the levels of activity include:

a level of activity representing the user presently engaged in a communication with another user.

25. The method of claim 15, wherein the levels of activity include:

a level of activity representing a user not presently available.

26. The method of claim 15, wherein the levels of activity include:

a level of activity representing a user not intending to engage in a communication with another user.

27. The method of claim 15, wherein the visual representation is an icon, and, there is provided a predetermined set of icons, each icon associated with a predetermined level of activity.

28. The method of claim 15, further comprising:

receiving in the first window on a first computer controlled by a first user a selection of a visual representation of at least one second user displayed in the first window; and displaying in response thereto data descriptive of the level of activity of each selected second user.

29. The method of claim 15, wherein the level of activity of a second user detected by the computer used by the second user is determined according to the second user's use of the computer.

30. The method of claim 15, further comprising:

providing in a computer of each of the first user and a number of second users at least one communication mechanism;

receiving on the computer of the first user a selection of visual representation of at least one second user displayed on the computer;

receiving from the first user a selection of a communication mechanism; and, establishing a computer controlled communication between the computer of the first user and the computer of at least one second user using the selected communication mechanism.

31. In a computer system for multiple users, a computer readable memory accessible by a first computer of a first user, the first computer having a processor and a first display, the memory storing at least one computer program executable by the processor and that provides communications between selected users, the computer program controlling the processor to:

determine for a first user selected second users for displaying a visual representations of the selected second users on the first display, the visual representation of each selected second user determined from a level of activity of the second user detected by a computer used by the second user;

display in a first display area on a selected first window on the first display, the visual representations of the selected second users;

receive in the first window on the first display a selection of a visual representation of at least one second user displayed in the first window;

receive on the first display a selection of a communication mechanism; and, establish a computer controlled communication between the first user and the at least one second user using the selected communication mechanism.

32. The memory of claim 31, wherein the computer program stored thereon further controls the processor to:

for each user, provide a second display area in the first display for receiving and displaying selected data items.

33. The memory of claim 32, wherein the second display area consists of:

data items received from the first user in the second display area of the first display; and data items received from at least one second user in a second display area of a first window displayed on a second computer controlled by the second user, where there is a visual representation of the at least one second user displayed in the first display area of the first display.

34. The memory of claim 32, wherein the computer program stored thereon controls the processor to display the visual representation of a selected second user displayed in the first display area according to a level of activity of the second user.

35. The memory of claim 34, wherein the level of activity of at least one second user is determined by the second user.

36. The memory of claim 34, wherein there is a predetermined number of levels of activity, each level of activity associated with a selected visual representation, such that for each second user, and the computer program controls the processor to display the selected visual representation of the second user according to the level of activity of the second user.

37. The memory of claim 36 wherein the visual representation is an icon, and, where is stored in the memory a predetermined set of icons, each icon associated with a predetermined level of activity.

38. The memory of claim 37, wherein a selected user provides the selected visual representation associated with a selected level of activity for the user, such that the selected visual representation is uniquely associated with the user and is displayed by the computer program only when the user has the selected level of activity.

39. The memory of claim 32, wherein the level of activity is determined by the computer program to be from a group comprising:

a first level of activity representing the user presently using a computer, and not presently engaged in a communication with another user;

a second level of activity representing the user not presently using a computer, and not presently engaged in a communication with another user; and, a third level of activity representing the user presently engaged in a communication with another user.

40. The memory of claim 39, wherein the level of activity is further determined to be one of a group comprising:

a fourth level of activity representing a user not presently available; and a fifth level of activity representing a user not intending to engage in a communication with another user.

41. The memory of claim 31, wherein the computer program stored thereon further controls the processor to:

receive in the first window on the first display a selection of a visual representation of at least one second user displayed in the first window; and display in response thereto data descriptive of a level of activity of each second user.

* * * * *